(12) United States Patent
Davis et al.

(10) Patent No.: US 9,237,194 B2
(45) Date of Patent: Jan. 12, 2016

(54) LOAD BALANCER AND FIREWALL SELF-PROVISIONING SYSTEM

(75) Inventors: Adam Davis, Silver Spring, MD (US); Andrew John Kulp, Chesapeake Beach, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 568 days.

(21) Appl. No.: 12/940,613

(22) Filed: Nov. 5, 2010

(65) Prior Publication Data
US 2012/0117571 A1 May 10, 2012

(51) Int. Cl.
*G06F 9/46* (2006.01)
*H04L 29/08* (2006.01)
*H04L 29/06* (2006.01)
*H04L 12/24* (2006.01)

(52) U.S. Cl.
CPC ........ *H04L 67/1025* (2013.01); *H04L 41/0806* (2013.01); *H04L 41/22* (2013.01); *H04L 63/0263* (2013.01); *H04L 63/101* (2013.01); *H04L 41/0253* (2013.01); *H04L 41/18* (2013.01)

(58) Field of Classification Search
None
See application file for complete search history.

(56) References Cited

U.S. PATENT DOCUMENTS

| | | | | |
|---|---|---|---|---|
| 7,426,537 | B2* | 9/2008 | Lee et al. | 709/204 |
| 2002/0198967 | A1* | 12/2002 | Iwanojko et al. | 709/220 |
| 2006/0143439 | A1* | 6/2006 | Arumugam et al. | 713/153 |
| 2012/0066371 | A1* | 3/2012 | Patel et al. | 709/224 |

* cited by examiner

*Primary Examiner* — Mengyao Zhe

(57) ABSTRACT

A method and system may receive a request to configure a computing resource, such as a load balancer or firewall based on configuration information received from a user via a web portal. The configuration information may be stored and a subsequent request to commit the stored configuration information may be received. One or more jobs may be queued in a jobs database based on the request to commit the configuration information. The one or more jobs may be dequeued by a workflow engine and executed to configure the computing resource.

14 Claims, 13 Drawing Sheets

LOAD BALANCER AND FIREWALL SELF-PROVISIONING SYSTEM

BACKGROUND INFORMATION

A system or network developer may sometimes purchase and stage devices to build a system or network, such as server devices, load balancers, firewalls, etc. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may enable user-directed provisioning of both virtual resources and physical resources including load balancing and firewall protection of virtual and physical server devices. When a user wishes to obtain computing resources (e.g., a network, a server, an application, a web server, etc.), the user may connect to an integrated provisioning system via a web portal. Once connected via a web interface, the user may configure a load balancing resource pool (also referred to as a virtual Internet protocol address (VIP)) to include one or more server devices, add or remove server device members to/from a VIP, take server devices in and out of service, etc. Based on received configuration selections, the integrated resource provisioning system may provision and allocate the servers in the VIP without manual intervention from a system administrator or an operator.

Figure 1:
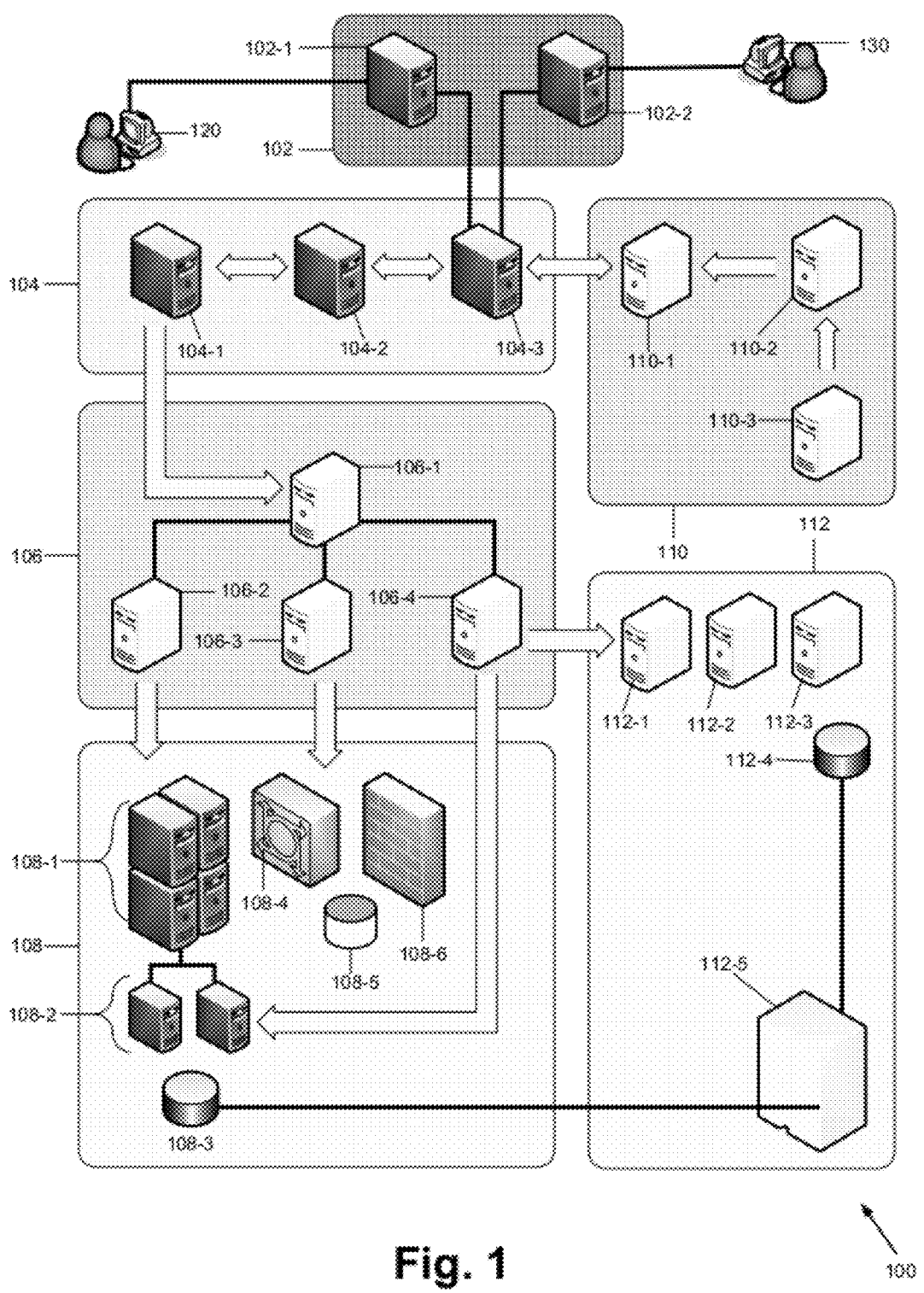
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to configure a load balancer or firewall.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.) and/or configuration tasks.

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information.

Resource management device 104-3 may receive a request for services from administrator/user device 120/130 via portal devices 102-1 and 102-2, and render the requested services. In rendering the services, resource management device 104-3 may execute functions that are listed in FIGS. 5A and 5B.

The services that resource management device 104-3 renders may include provisioning/de-provisioning resources based on inventory information provided by inventory management network 110. To provision/de-provision the resources (e.g., cluster), resource management device 104-3 may create a description of a job based on: user input relayed by user portal device 102-2; user configuration; and/or available resources. Resource management device 104-3 may handoff the job description to job database device 104-1, to be placed in the active job queue. In some implementations, resource management device 104-3 may provision multiple servers, allocate Internet Protocol (IP) addresses to the servers, provision a storage space shared by the servers, create a cluster from the servers, configure devices or components of network 100, such as a load balancer or firewall.

In providing the services, resource management device 104-3 may manage resource objects that correspond to physical or virtual resources in networks 102-112. Thus, for example, when user device 130 requests information relating to a physical server, via user portal device 102-2, resource management device 104-3 may provide user device 130 with information from the resource object representing the physical server. Resource management device 104-3 may receive data for instantiating the resource objects from one or more databases in networks 102-112 (e.g., a database in network 110).

Workflow network 106 may perform jobs whose descriptions are in the active job queue at job database device 104-1. Once the job is performed, workflow network 106 may instruct job database device 104-1 to dequeue the job description (e.g., provisioning a server, creating a cluster, etc.). As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In driving/performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine, clone a virtual machine, etc.). VMM control device 106-2, upon receiving requests from workflow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from workflow engine device 106-1, VMM control device 106-2 may issue a command to a hypervisor. The hypervisor may create the virtual machine on the host device.

Network management device 106-3 may perform network configuration functions on behalf of workflow engine device 106-1. The functions may include configuring network infrastructure components. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by workflow engine device 106-1. Once allocated, logical volume 108-3 may be mounted on a mount point on a virtual machine and used as storage (e.g., a file system, swap space, etc.). As described in additional detail below, virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). In other implementations, load balancer 108-4 may be configured to distribute network traffic across virtual machines 108-2 in an even or "round robin" manner, Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted and configured upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementaiton, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses.

Data warehouse device 110-2 may include database of inventory of resources that are available for provisioning, resources that have been provisioned for the user, and configuration management information. When a resource is added to a pool, is provisioned, or is de-provisioned, data warehouse device 110-2 may update/record the information (e.g., inventory information) about the resource into the database. In addition, data warehouse device 110-2 may write and insert data associated with configuration (e.g., a version of an operating system that is installed on a provisioned physical server, an IP address, etc.) into the database when resource configuration changes.

Inventory management device 110-3 may obtain inventory and configuration related information by monitoring physical devices, and pass the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112-x and collectively as physical resources 112), logical volume 112-4, and storage device 112-5. Physical resource 112-x may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 through 112 may include additional, fewer, or different components than those shown in FIG. 1. In addition, depending on the implementation, functionalities of each of the devices within networks 102-112 may be aggregated over fewer devices or distributed over additional devices. For example, in one implementation, functionalities of devices 112-1 through 112-3 in resource management network 112 may be provided by a single server device.

Figure 2:
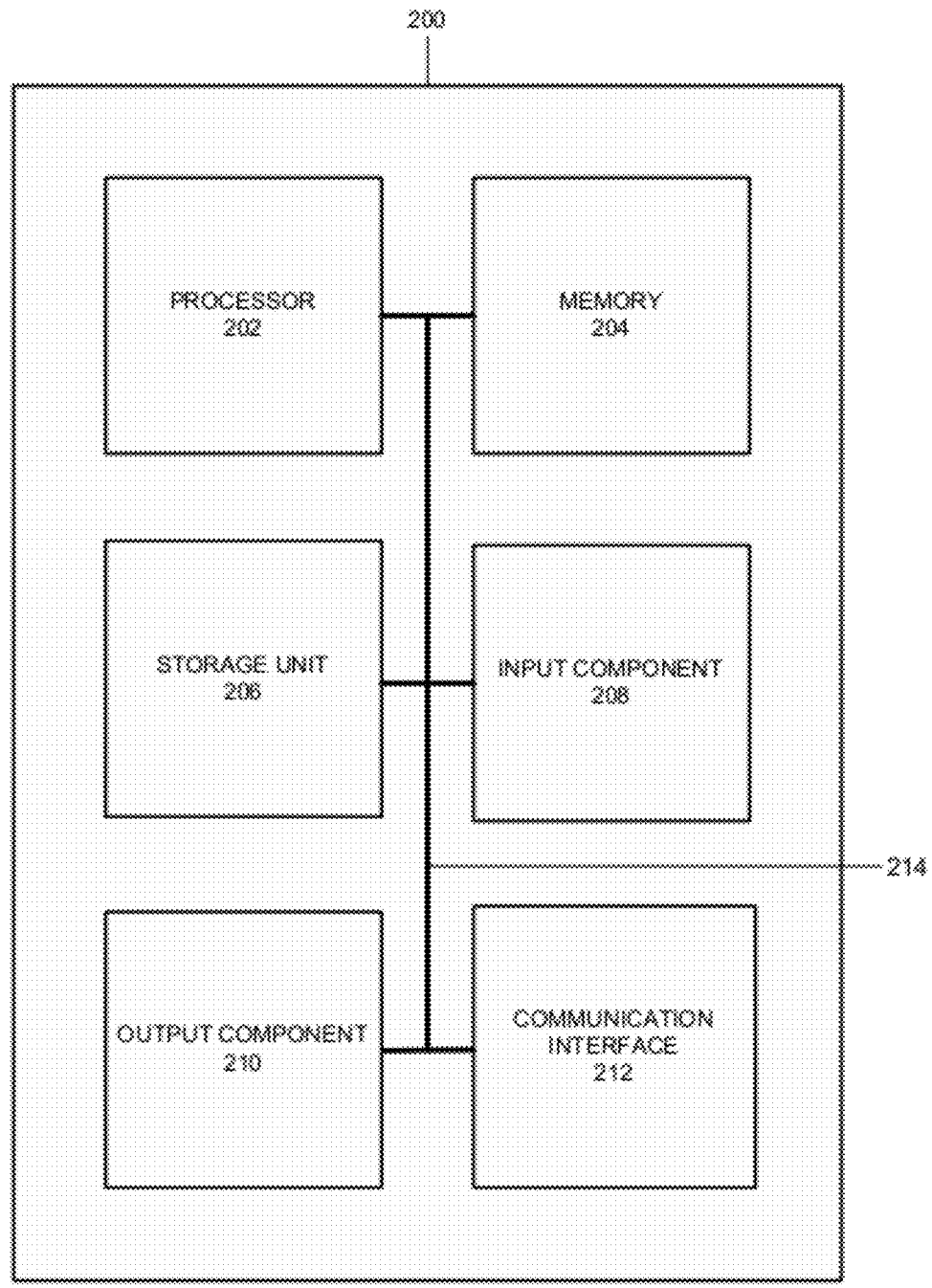
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that hosts a hypervisor. As shown in FIG. 2, network device 200 may include a processor 202, memory 204, storage unit 206, input component 208, output component 210, communication interface 212, and bus 214.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5) or a network (e.g., storage area network (SAN)). Depending on the context, the term "medium," "memory," "storage," "storage device," "storage medium," and/or "storage unit" may be used interchangeably. For example, a "computer-readable storage device" or "computer readable storage medium" may refer to both a memory and/or storage device.

Input component 208 may permit a user to input information to network device 200. Input component 208 may include, for example, a keyboard, a keypad, a mouse, a pen, a microphone, a touch screen, voice recognition and/or biometric mechanisms, etc. Output component 210 may include a mechanism that outputs information to the user. Output component 210 may include, for example, a display, a printer, a speaker, etc. In some implementations, because network device 200 may operate as a server device, network device 200 may include a minimal number of input components 208 and output components 210 (e.g., a keyboard and/or a console), to minimize cost and to increase robustness.

Communication interface 212 may enable network device 200 or the components of network device 200 to communicate with other devices and/or systems via a network, and may include one or more network interface cards (e.g., an Ethernet interface) for communicating with other devices. In one implementation, communication interface 212, for example, may be attached to a server blade that hosts processor 202. Bus 214 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc. In yet another example, the components of network device 200 may be distributed over a network.

Figure 3:
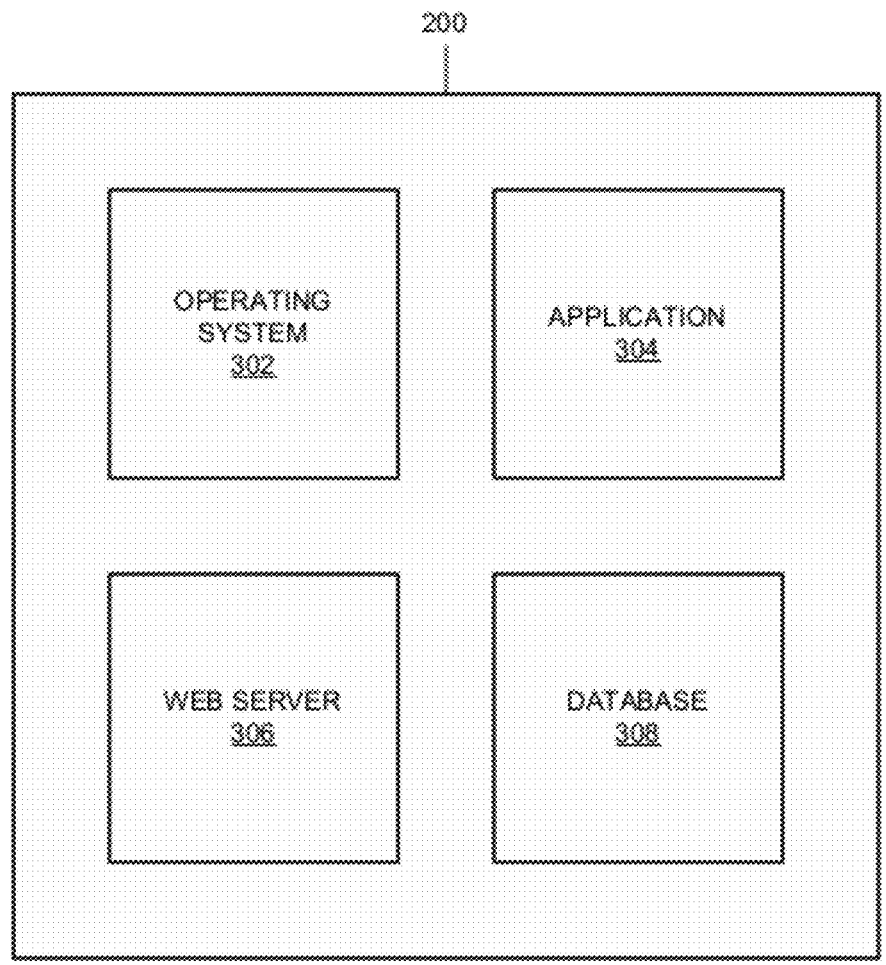
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
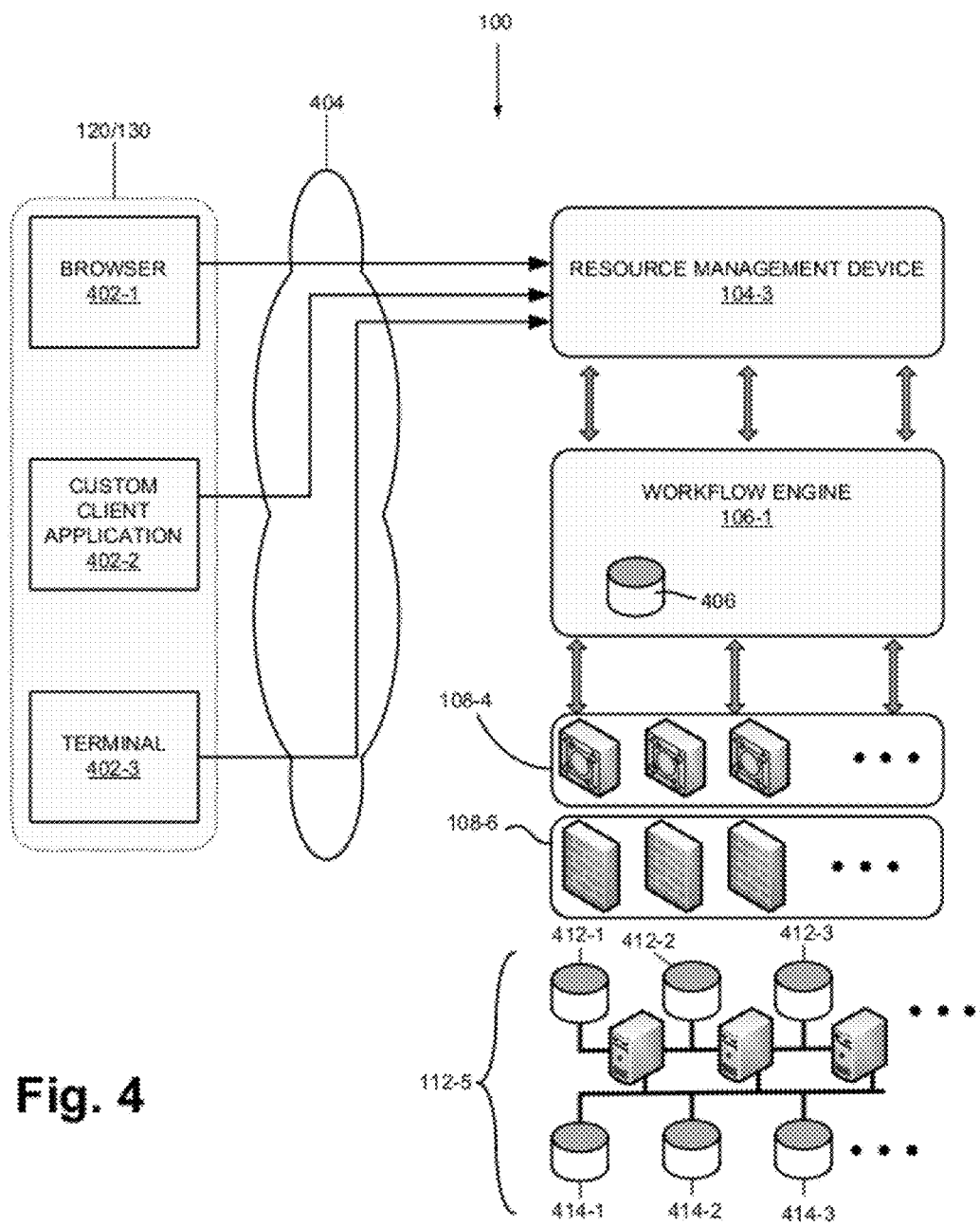
FIG. 4 illustrates an exemplary interaction between a user device, resource management device, workflow engine, load balancer, firewall, and storage devices of FIG. 1 for provisioning and/or managing resources.

FIG. 4 illustrates interaction between administrator/user device 120/130, resource management device 104-3, workflow engine device 106-1, virtual load balancers 108-4, and virtual firewalls 108-6, for provisioning and/or managing a load balancing VIP and firewall resources. As shown in FIG. 4, administrator/user device 120/130 may interact with resource management device 104-3 and workflow engine device 106-1 over network 404. Network 404 may be part of network 100, and may include network or network devices, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Internet Explorer, Firefox, etc.). Custom client application 402-2 may include a software component specifically designed for interacting with resource management device 104-3 and/or workflow engine device 106-1. Terminal 402-3 may include a command line based client terminal for remotely accessing different services, such as telnet services, SFTP services, etc.

As further shown, resource management device 104-3 may interact with workflow engine device 106-1. More specifically, administrator/customer requests for load balancing and firewall configuration may be received by resource management device 104-3 via network 404 (e.g., the Internet, etc.). Resource management device 104-3 may generate a corresponding job and queue the job for execution (e.g., in jobs database device 104-1) by workflow engine device 106-1. In addition, consistent with implementations described herein, resource management device 104-3 may maintain and provide information relating to configuration settings of configured devices (e.g., load balancers 108-4 and firewalls 108-6).

In this manner, resource management device 104-3 may efficiently provide accurate information regarding configured devices and historical configuration settings to the user or administrator.

Workflow engine device 106-1 may de-queue and act upon jobs from the jobs database (e.g., jobs database device 104-1) created by resource management device 104-3. More specifically, workflow engine device 106-1 may retrieve job information from the jobs database that include, for example, core parameters, execution strings, called resources, etc. Based on the job information, workflow engine 106 may call one or more scripts or flows that correspond to the received information for execution on network management device 106-3. These scripts or flows may cause information to be transmitted to or exchanged with load balancers 108-4 (3 of which are shown in FIG. 4) or firewall devices 108-6 ((3 of which are shown in FIG. 4).

In configuring load balancers 108-4 and/or firewall devices 108-6, workflow engine device 106-1 may access logical volumes. As shown in FIG. 4, the logical volumes may be implemented with storage device 112-5. In one implementation, storage device 112-5 may include SAN disks 412-1, 412-2, 412-3, etc., and NAS devices 414-1, 414-2, 414-3, etc., although load balancers 108-4 and/or firewall devices 108-6 may be configured to utilize any combination of virtual or physical storage or server devices.

In FIG. 4, administrator/user device 120/130 may facilitate controlling, monitoring, provisioning, or de-provisioning a load balancer or firewall device via browser 402-1. Through different devices (e.g., user portal device 102-2), a user's request for a service may reach workflow engine device 106-1. Workflow engine device 106-1 may then carry out the user's request by performing a set of functions. Other types of requests for services may reach other devices in network 102-112 in a similar manner.

Figure 5A:
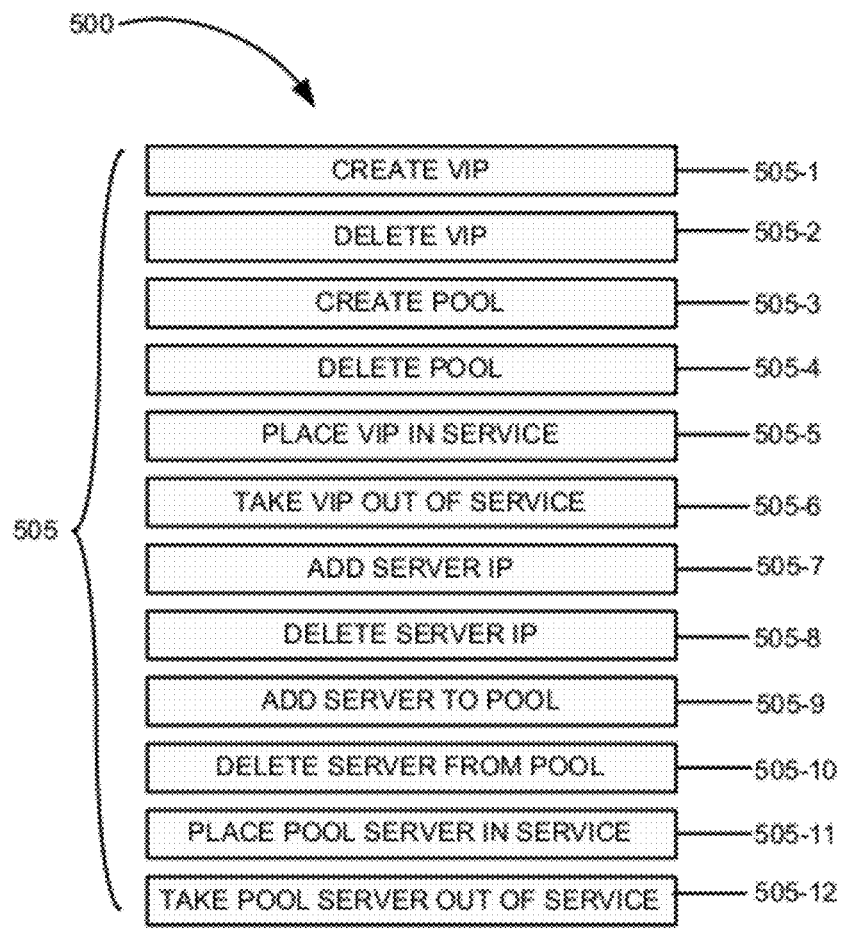
FIGS. 5A and 5B illustrate a listing of exemplary functions that the workflow engine of FIG. 1 may support for provisioning and/or managing load balancers and firewalls.
Figure 5B:
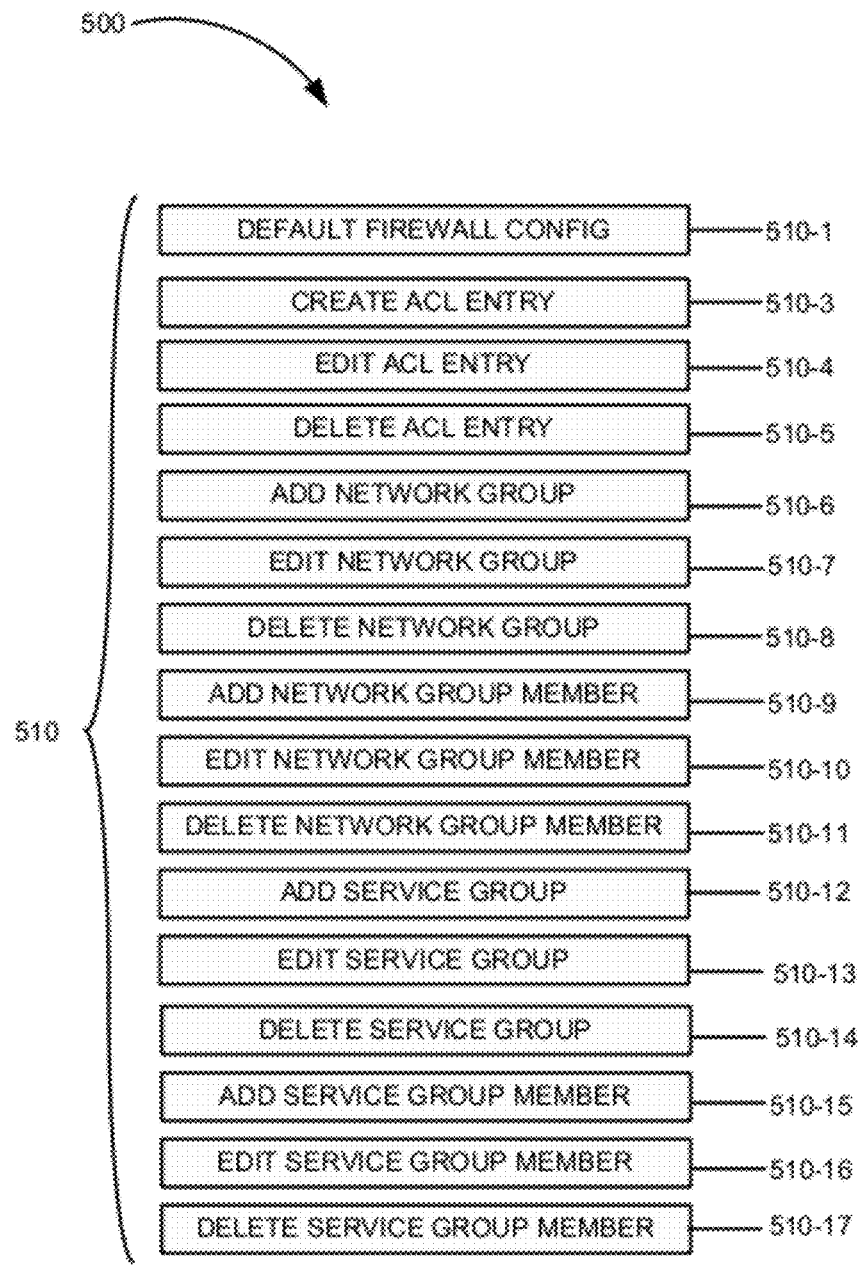

FIGS. 5A and 5B provide a listing of exemplary functions 500 that workflow engine device 106-1 may support for provisioning and/or managing load balancers 108-4 and firewalls 108-6. As shown, workflow engine device 106-1 may be requested to perform functions 505-1 through 510-17 for load balancers 108-4 and/or firewalls 108-6. For example, when a resource management device 104-3 receives, from user device 130, a service request to configure a load balancer 108-4, resource management device 104-3 may execute one or more of functions 505-1 to 505-12, as described below. This may generate one or more a job descriptions for provisioning and/or configuring load balancer 108-4 and hand off the job descriptions to job database device 104-1 for execution by workflow engine device 106-1. Depending on the implementation, workflow engine device 106-1 may provide support for other functions and/or other types of devices.

Functions 500 may include load balancer functions 505 and firewall functions 510. Load balancer functions 505 may enable and support the provisioning and configuration of a load balancer 108-4 to establish a pool of physical or virtual servers (referred to as a virtual IP, server VIP, or load balancing VIP). Firewall functions 510 may enable the configuration of a firewall device 108-6 to generate and implement security policies or rules.

Load balancer functions 505-1 to 505-12 may include create VIP 505-1, delete VIP 505-2, create pool 505-3, delete pool 505-4, place VIP in service 505-5, take VIP out of service 505-6, add server IP 505-7, delete server IP 505-8, add server to pool 505-9, delete server from pool 505-10, place pool server in service 505-11, and take pool server out of service 505-12.

Create VIP function 505-1 may create a new VIP within a virtual load balancer 108-4. As used herein, the term "VIP" refers to a grouping (e.g., one or more) servers or other storage devices or resources across which load may be balanced by virtual load balancer 108-4. In one implementation, execution of create VIP function 505-1 may generate a new virtual Internet protocol (VIP) address associated with the new VIP. In other implementations, create VIP function 505-1 may receive a specified IP address from the user device 130. In addition, create VIP function 505-1 may also facilitate creation of a VIP for a particular port, protocol, and load balancing algorithm type (e.g., round robin, weighted round robin, etc.). In one implementation, the designation of the port, protocol, and load balancing algorithm may be received from user device 130 via user portal device 102-2 or administrator portal device 102-1.

In one embodiment, VIPs are initially generated in an out of service state, awaiting addition of pool members and. Consistent with implementations described herein, a job request for execution of create VIP function 505-1 may invoke the execution of a load balancer VIP creation script on a network management device 106-3 to provision and configure load balancer 108-4. In addition, execution of create VIP function 505-1 may invoke execution of one or more firewall functions 510, such as execution of default firewall configuration function 510-1, etc.

Delete VIP function 505-2 may delete a VIP within virtual load balancer 108-4. In one implementation, execution of delete VIP function 505-2 may delete the VIP address associated with a previously established VIP. Consistent with implementations described herein, a job request for execution of delete VIP function 505-2 may invoke the execution of a load balancer VIP delete script on network management device 106-3 to provision and configure load balancer 108-4. In addition, execution of delete VIP function 505-2 may invoke execution of one or more firewall functions 510, such as execution of delete firewall configuration function 510-2, etc.

Create pool function 505-3 may create a server pool for a VIP created by function 505-1. In one implementation, execution of create server pool function 505-3 associated with a designated VIP. Consistent with implementations described herein, a job request for execution of create server pool function 505-3 may invoke the execution of a load balancer pool create script on a network management device 106-3 to provision and configure load balancer 108-4.

Delete pool function 505-4 may delete a server pool from within an established virtual VIP on virtual load balancer 108-4. In one implementation, execution of delete pool function 505-4 may delete a previously established server pool associated with a previously established VIP. Consistent with implementations described herein, a job request for execution of delete pool function 505-4 may invoke the execution of a load balancer pool delete script on network management device 106-3 to provision and configure load balancer 108-4. Consistent with implementations described herein, server pool creation or deletion via functions 505-3 and 505-4 may be automatically invoked upon creation and deletion of a VIP via functions 505-1 and 505-2.

Place VIP in service function 505-5 may change the state of an established VIP from out of service to in service. Consistent with implementations described herein, a job request for execution of place VIP in service function 505-5 may invoke the execution of a load balancer VIP in service script on network management device 106-3 to provision and configure load balancer 108-4. In exemplary embodiments, execution of the place VIP in service function 505-5 requires that the VIP be previously established.

Take VIP out of service function 505-6 may change the state of an established VIP from in service to out of service. Taking a VIP out of service enables server pools and pool members (e.g., servers) to be added to the VIP. In addition, following execution of function 505-6, active connections and sessions to any server devices in the VIP will be discontinued. To allow connections to timeout, take pool server out of service function 505-12 may be executed. Consistent with implementations described herein, a job request for execution of take VIP out of service function 505-6 may invoke the execution of a load balancer VIP out of service script on network management device 106-3 to provision and configure load balancer 108-4.

Add server IP function 505-7 may add a server (e.g., a virtual or physical server having a particular IP address) to load balancer 108-4. Consistent with implementations described herein, a job request for execution of add server function 505-7 may designate a particular server IP address. In addition, execution of add server IP function 505-7 may invoke the execution of a load balancer real IP create script on network management device 106-3 to provision and configure load balancer 108-4. In one exemplary implementation, execution of add server IP function 505-7 may cause workflow engine device 106-1 to determine whether a particular server (e.g., a server having the designated IP address) has been previously added to the load balancer 108-4. If so, the designated server will not be added to the load balancer 108-4 a second time, rather the previously created server may be added to a particular VIP server pool via function 505-9.

Delete server IP function 505-8 may remove a previously added server (e.g., a virtual or physical server) from load balancer 108-4. In some implementations, function 505-8 may be invoked upon deletion of a designated server IP from a last pool on load balancer 108-4 (e.g., via function 505-10). Consistent with implementations described herein, a job request for delete server IP function 505-8 may invoke the execution of a load balancer real IP delete script on network management device 106-3 to provision and configure load balancer 108-4.

Add server to pool function 505-9 may add a server (e.g., a virtual or physical server) to an established server pool associated with a particular VIP (e.g., created via create pool function 505-3). Consistent with implementations described herein, a job request for execution of add server to pool function 505-9 may designate a particular VIP, a particular server pool, and designated server IP address. In addition, execution of add server to pool function 505-9 may invoke the execution of a load balancer real IP in pool script on network management device 106-3 to provision and configure load balancer 108-4. Execution of add server to pool function 505-9 may only be performed for established VIPs, established server pools, and for servers IPs added to the load balancer 108-4 (e.g., via function 505-7).

Delete server from pool function 505-10 may delete a server (e.g., a virtual or physical server) from an established server pool. Consistent with implementations described herein, a job request for execution of delete server from pool function 505-10 may designate a particular VIP, a particular server pool, and designated server IP address. In addition, execution of delete server from pool function 505-10 may invoke the execution of a load balancer real IP out of pool script on network management device 106-3 to provision and configure load balancer 108-4. In addition, workflow engine device 106-1 may be configured to determine whether the server being removed from the pool is the last server in the last pool associated with the VIP. If so, workflow engine device 106-1 may automatically invoke delete server from VIP function 505-8.

Place pool server in service function 505-11 may change the state of an established server in an established pool from out of service to in service. Consistent with implementations described herein, a job request for execution of place pool server in service function 505-11 may invoke the execution of a load balancer server in service script on network management device 106-3 to provision and configure load balancer 108-4. In exemplary embodiments, execution of place pool server in service function 505-11 requires that the VIP be previously established.

Take pool server out of service function 505-12 may change the state of an established server in an established pool from in service to out of service. Taking a server out of service enables the server to be edited or otherwise configured. In addition, following execution of function 505-12, active connections and sessions to the designated server will timeout in contrast to discontinued connections and sessions resulting from function 505-6. Consistent with implementations described herein, a job request for execution of take VIP out of service function 505-12 may invoke the execution of a load balancer server out of service script network management device 106-3 to provision and configure load balancer 108-4.

Referring to FIG. 5B, firewall functions 510-1 to 510-6 may include default firewall configuration 510-1, create access control list (ACL) entry 510-3, edit ACL entry 510-4, delete ACL entry 510-5, add network group 510-6, edit network group 510-7, delete network group 510-8, add network group member 510-9, edit network group member 510-10, delete network group member 510-11, add service group 510-12, edit service group 510-13, delete service group 510-14, add service group member 510-15, edit service group member 510-16, and delete service group member 510-17.

As described briefly above, in an exemplary implementation default firewall configuration function 510-1 may be automatically executed upon creation of a VIP in load balancer 108-4 (e.g., via functions 505-1). Execution of default firewall configuration function 510-1 may cause a single ACL entry to be formed allowing all Internet traffic to the VIP on a predefined port number or port numbers.

Create ACL entry function 510-3 may add an ACL entry to firewall 108-6. An ACL defines the firewall rules implemented by firewall 108-6. The firewall rules control access into and out of network resources associated with the firewall, such as VIPs controlled by load balancer 108-4. In exemplary implementations, elements of an ACL entry may include an action (e.g., permit or deny), a source group (e.g., where the traffic is originating from), a destination group (where the traffic is trying to go), and port/protocol information. Create ACL entry function 510-3 may designate established network groups and service groups configured via functions 510-6, 510-7, 510-12, and 510-13.

Edit ACL entry function 510-4 may modify an existing ACL entry created via create ACL entry function 510-3. ACL entry changes may include modifications to the source group, the destination group, the port/protocol, or the action. Delete ACL entry function 510-5 may delete an existing ACL entry from firewall 108-6.

Add network group function 510-6 may add a network group to a firewall 108-6 for use by create ACL entry function 510-3. A network group refers to any grouping of network sources or destinations and may include, for example, VIPs or other resources. Edit network group function 510-7 may modify a network group created via add network group function 510-6, such as changing a VIP identifier, etc. Delete network group function 510-8 may delete an existing network group from firewall 108-6.

Add network group member function 510-9 may add a particular network resource as a member of a network group created or modified by functions 510-6 and 510-7. Exemplary network group members may include networks and hosts. Edit network group member function 510-10 may modify a network group member created via add network group member function 510-9. Delete network group member function 510-11 may delete an established network group member from a network group.

Add service group function 510-12 may add a service group to a firewall 108-6 for use by create ACL entry function 510-3. A service group refers to a combination of ports (e.g., destination ports) and/or protocols associated with a particular ACL entry or firewall rule. Edit service group function 510-3 may modify a service group created via add service group function 510-12, such as changing a VIP identifier, etc. Delete service group function 510-14 may delete an existing service group from firewall 108-6.

Add service group member function 510-15 may add a particular port/protocol combination resource as a member of a service group created or modified by functions 510-12 and 510-13. In one exemplary implementation, service group members may be defined by a protocol, a port number, and an operator. The rules enforced by firewall 108-6 may be based on the service group applied to particular traffic sources and destinations. For example a service group for a particular VIP may be configured to include a service group member defining tcp protocol received on port 25. Upon inclusion of this service group in a particular ACL entry, firewall device 106-8 may either permit or deny tcp protocol traffic received on port 25 between source and destination network groups.

Edit service group member function 510-16 may modify a service group member created via add service group member function 510-15. Delete service group member function 510-17 may delete an established service group member from a service group on firewall 108-6.

In the above, the functions that are listed in FIG. 5 may be used to manage, configure, control, provision and/or de-provision load balancer 108-4 and/or firewall 108-6 in virtual system network 108. Other network devices and/or networks 102-112 may use different functions to manage, control, provision and/or de-provision other types of resources (e.g., physical devices, machine access control (MAC) addresses, IP addresses, logical volume, etc.) and/or to control workflow processes.

Figure 6:
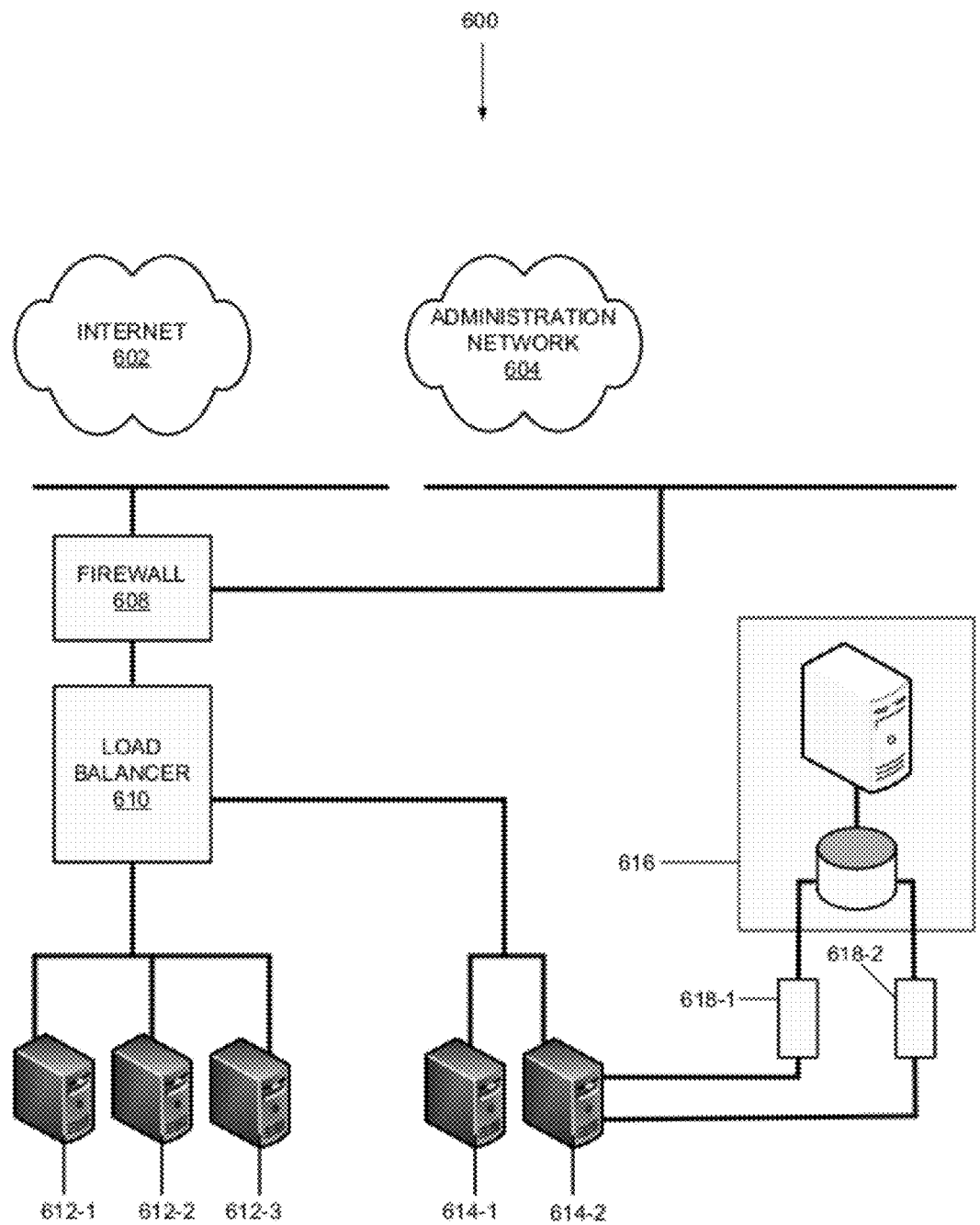
FIG. 6 is a diagram of exemplary resources that the system of FIG. 1 may provision.

FIG. 6 is a diagram of exemplary resources that network 100 of FIG. 1 may provision. As shown in FIG. 6, a user may be provisioned with connectivity to the Internet 602, administration network 604, firewall 608, load balancer 610, virtual server devices 612-1 through 612-3, physical server devices 614-1 and 614-2, storage device 616, and fiber channels 618-1 and 618-2.

Administration network 604 may provide services such as a backup service, security service, billing, etc. Firewall 608 may safeguard virtual server devices 612-1 through 612-3 and physical server devices 614-1 and 614-2 from outside networks via enforcement of firewall security rules and/or network address translation (NAT). Load balancer 610 may balance network traffic over different devices (e.g., load balance between virtual server devices 612-1 through 612-3 and physical server devices 614-1 and 614-2). In some implementations, firewall 608 and load balancer 610 may be provided as virtual devices incorporated into a single network device.

Virtual server devices 612-1 through 612-3 may host applications in virtual environments. Physical server devices 614-1 and 614 may host applications in physical devices. Each of physical server devices 614 may access storage device 616 via one of two channels 618-1 and 618-2, which are provided for redundancy in case of a fiber channel failure.

In the manner described above, the user at user device 130 may request network 100 to provision firewall 608 and/or load balancer 610 via user portal device 102-2. For example, via a web interface, a user at user device 130 may configure load balancer 610 to include a VIP having a number of virtual machines, physical devices, and/or network components. In addition, via the web interface, the user at user device 130 may configure firewall 608 to control access to/from the VIP or other network components.

Figure 7A:
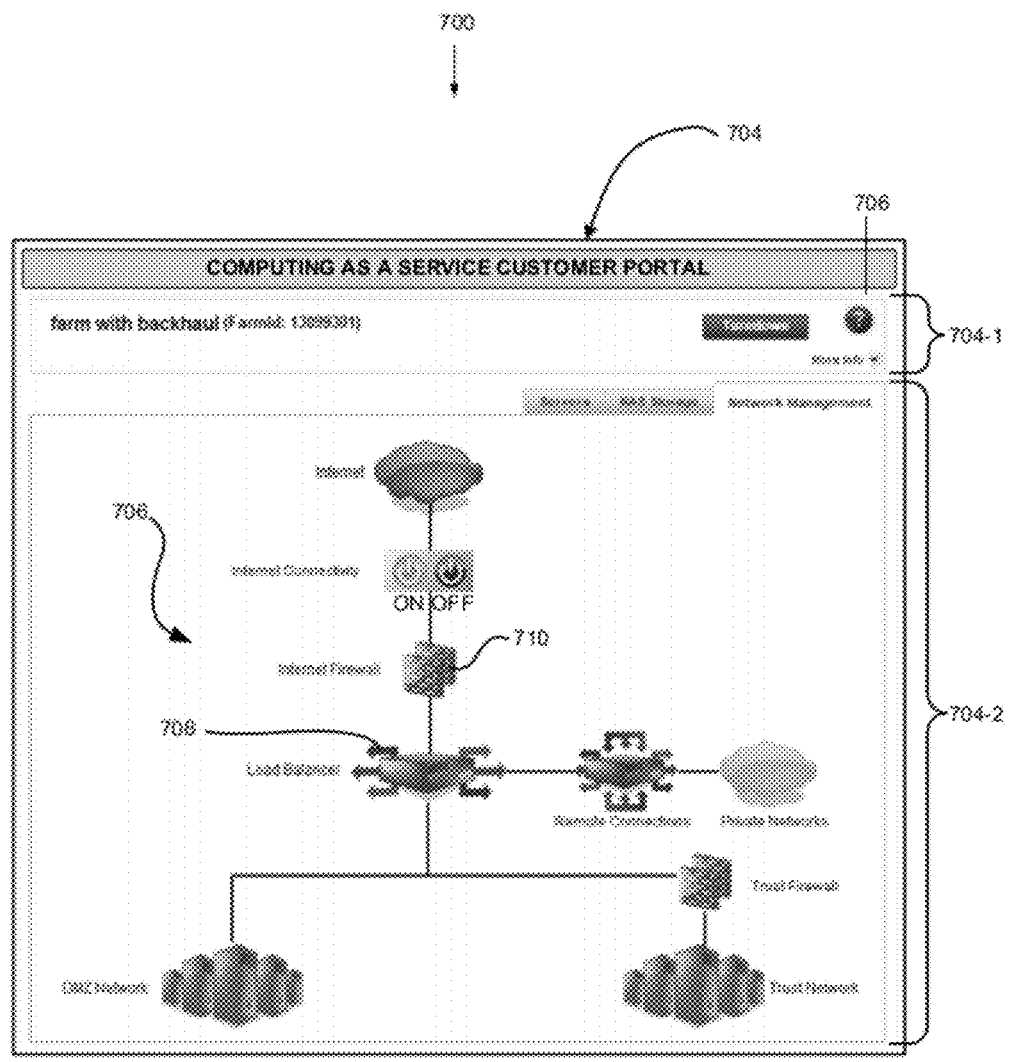
FIGS. 7A-7C illustrates an exemplary view of a web-based user interface for configuring a load balancer.

FIG. 7A illustrates an exemplary view 700 of a web-based user interface for controlling, monitoring, provisioning, and/or de-provisioning resources. More specifically, view 700 shows a web page 704 that provides and interactive overview of provisioned resources associated with a particular user, including firewall 108-6 and load balancer 108-4. Some features of a typical web browser, such as a navigation bar, etc., are not illustrated for simplicity.

As shown, web page 704 may include an identification/turndown section 704-1 and a main section 704-1. Identification/turndown section 704-1 may include an identification of a particular user account being managed/provisioned and an option to turndown the system/account. Main section 704-1 may include an interactive diagram 706 graphically depicting the network configuration associated with account identified in section 704-1. Consistent with embodiments described herein, interactive diagram 706 may include a load balancer icon 708 and a firewall icon 710. Clicking on or otherwise selecting load balancer icon 708 or a firewall icon 710 enables configuration of load balancer 108-4 and firewall 108-6 via the functions described in detail above with respect to FIGS. 5A and 5B. Depending on the implementation, the view 700 may include additional, fewer, or different features than those shown in FIG. 7A.

Figure 7B:
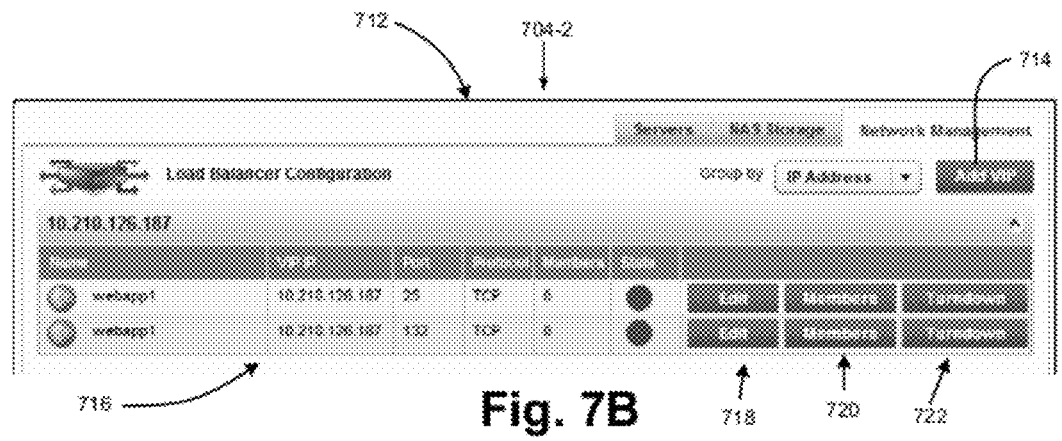

FIG. 7B illustrates an exemplary main section 704-2 of view 700 that is displayed upon selection of load balancer icon 708 in FIG. 7A. More specifically, main section 704-2 includes a load balancer configuration interface 712 that provides information and configuration options for configuring load balancer 108-4. Load balancer configuration interface 712 may include an add VIP option 714, and, for each established VIP, a listing 716 of server members. Additionally, for each server member in listing 716, interface 712 may provide edit, members, and turndown options 718, 720, and 722, respectively. Based on selections made and information submitted, these options may trigger queuing of any of functions 505-3 to 505-12 in resource manager 104-3 and execution of the functions in workflow engine device 106-1.

Figure 7C:
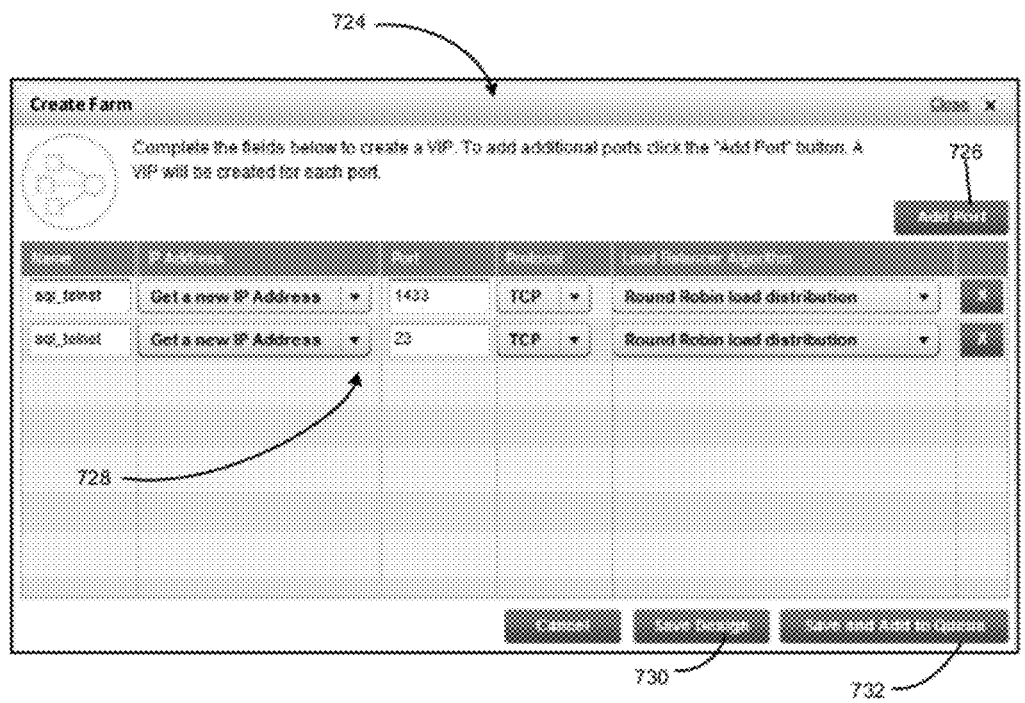

FIG. 7C is a exemplary web interface view 724 provided in response to a user selection of add VIP option 714 in interface 712. As shown, web interface view 724 may include an add port option 726 and a listing 728 of VIP ports to be created. Consistent with implementations described herein, any number of ports may be added to a particular VIP. Selection of add port option 726 places a new entry in listing 728 with user completed sections for VIP name, IP address (e.g., manually assigned, or assigned based on IP addresses available to the user), port number, protocol, and load balancing algorithm to apply.

Interface 724 further provides options to save 730 and save and add to queue 732. Selection of save option 730 saves the configured VIP, but does not forward any associated functions (e.g., functions 505-3 to 505-12) to resource management device 104-3. Selection of save and add to queue option 732 saves the configured VIP and forwards functions associated with the configuration (e.g., functions 505-3 to 505-12) to resource management device 104-3 for execution by workflow engine device 106-1.

Figure 8A:
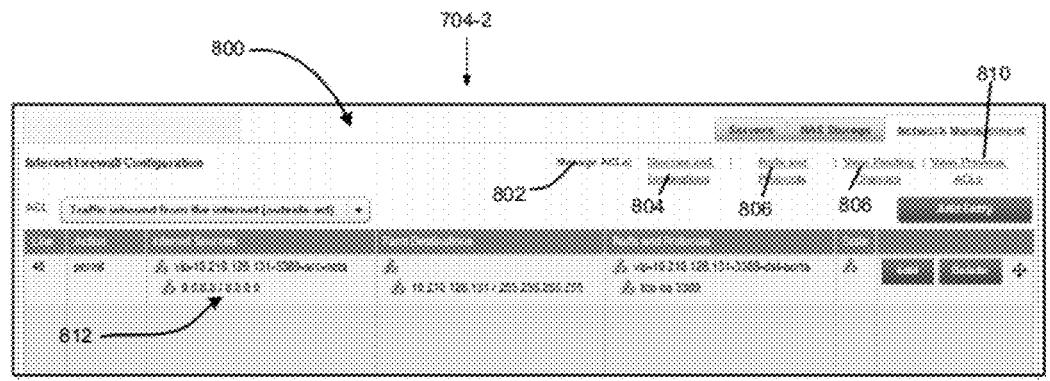
FIGS. 8A-8C are exemplary views of a web-based user interface for configuring a firewall.

FIG. 8A illustrates an exemplary main section 704-2 of view 700 that is displayed upon selection of firewall icon 710 in FIG. 7A. More specifically, main section 704-2 includes a firewall configuration interface 800 that provides information and configuration options for configuring firewall 108-6. Firewall configuration interface 800 may include an option 802 for managing ACLs, an option 804 for managing sources and destinations (e.g., network groups), an option 806 for managing ports and protocols (e.g., service groups), an option 808 for viewing pending changes, and an option 810 for viewing previous ACL configurations. Firewall configuration interface 800 in FIG. 8A shows an ACL section 812 provided in response to user selection of option 802. As shown, ACL section 812 includes options for adding, editing, and deleting ACL entries. These options correspond to functions 510-3, 510-4, and 510-5 described above. Selection of options 804 and 806 provide similar functionality with respect to creating, editing, and deleting network groups and service groups consistent with functions 510-6 to 510-17 described above.

Figure 8B:
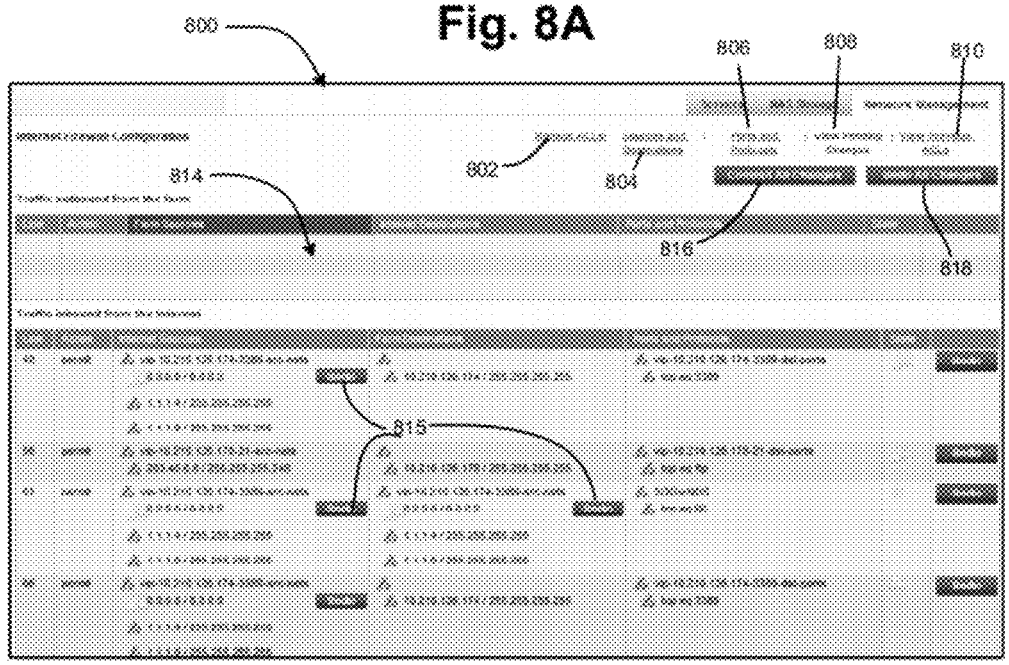

Consistent with implementations described herein, changes to the ACL made via option 802 in firewall configuration interface 800 are not immediately saved and queued in resource management device 104-3 for execution by workflow engine device 106-1. This prevents users from making inadvertent changes to a firewall configuration. Rather, any changes to a firewall configuration (e.g., to ACL list entries associated with firewall 108-6) are stored for user review prior to "committing" or queuing for implementation. FIG. 8B illustrates an exemplary firewall configuration interface 800 view provided upon user selection of option 808 relating to viewing pending changes.

As shown in FIG. 8B, firewall configuration interface 800 may be configured to provide a listing 814 of ACL entries for each of a number of different ACLs (e.g., outbound traffic ACL, inbound traffic ACL, etc.). Each entry in listing 814 may indicate a line of the ACL, an action corresponding to the entry, network groups effected by the entry, ports/protocol information corresponding to the entry, and a state indicator. In addition, each entry in which a user has made un-committed changes (e.g., via selection of option 802), a graphical indicator 816 may be provided in proximity to the changed information. As shown in FIG. 8B, graphical indicator 816 may include an undo option, the selection of which enables the user to undo or reverse the corresponding change.

Firewall configuration interface 800 corresponding to option 808 may also include a commit all changes option 816 and an undo all changes option 818. Upon user selection of the commit all changes option 816, changes to the ACL entries are saved and associated functions (e.g., function 510-3-510-5) are forwarded to resource management device 104-3 for execution by workflow engine device 106-1. Consistent with implementations described herein, when more than one change is made, the jobs associated with the changes may be queued by resource management device 104-3 as a single multi-step job, in which the order of the job functions are optimized based on the ACL changes made. User selection of undo all changes option 818 discards all changes and reverts the firewall to the previously saved configuration. In this instance, no jobs or functions are forwarded to resource management device 104-3.

Figure 8C:
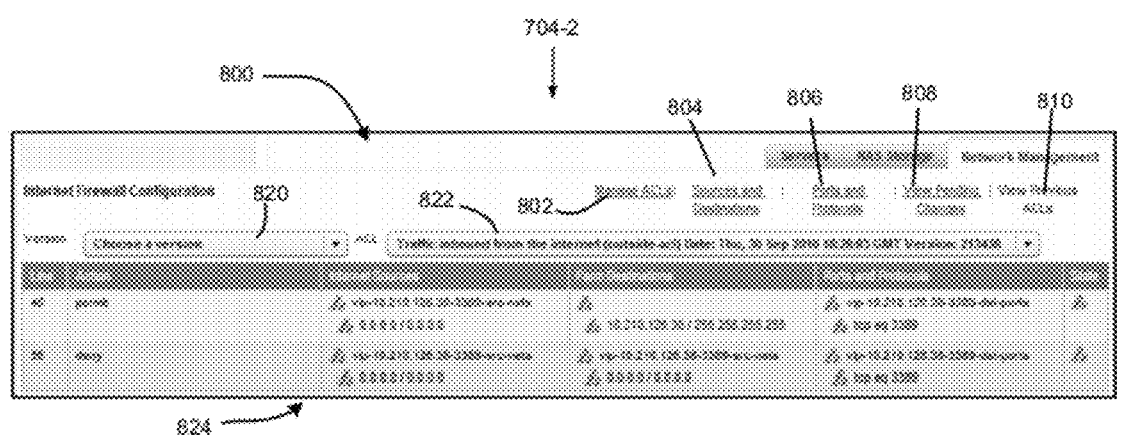

FIG. 8C illustrates an exemplary firewall configuration interface 800 view provided upon user selection of option 810 relating to viewing prior ACL configurations. As shown in FIG. 8C, firewall configuration interface 800 may be configured to provide a version selection option 820, an ACL selection option 822, and a prior ACL listing 824. Version selection option 820 is configured to receive a user selection of a particular version of an ACL. For example, as shown in FIG. 8C, selection option 820 may include a drop down menu or other selection mechanism for allowing the user to select from a number of available versions. Similarly, ACL selection option 822 is configured to receive a user selection of a particular ACL, e.g., the inbound traffic ACL from a particular date and time. Each entry in listing 814 may indicate a line of the ACL, an action corresponding to the entry, network groups effected by the entry, ports/protocol information corresponding to the entry, and a state indicator.

Consistent with implementations described herein, the information regarding prior versions of firewall configurations may be maintained in, for example, resource manager database 104-2. This information may be stored in upon every save or commit of firewall configuration changes.

Although not shown explicitly in FIG. 8C, interface 800 associated with option 810 relating to viewing prior ACL configurations may be configured to provide users with an option to restore an ACL configuration to a prior version of the ACL configuration. This is particularly useful in the event of unexpected errors that arise following implementation of ACL changes in the manner described above in relation to FIGS. 8A and 8B.

Figure 9:
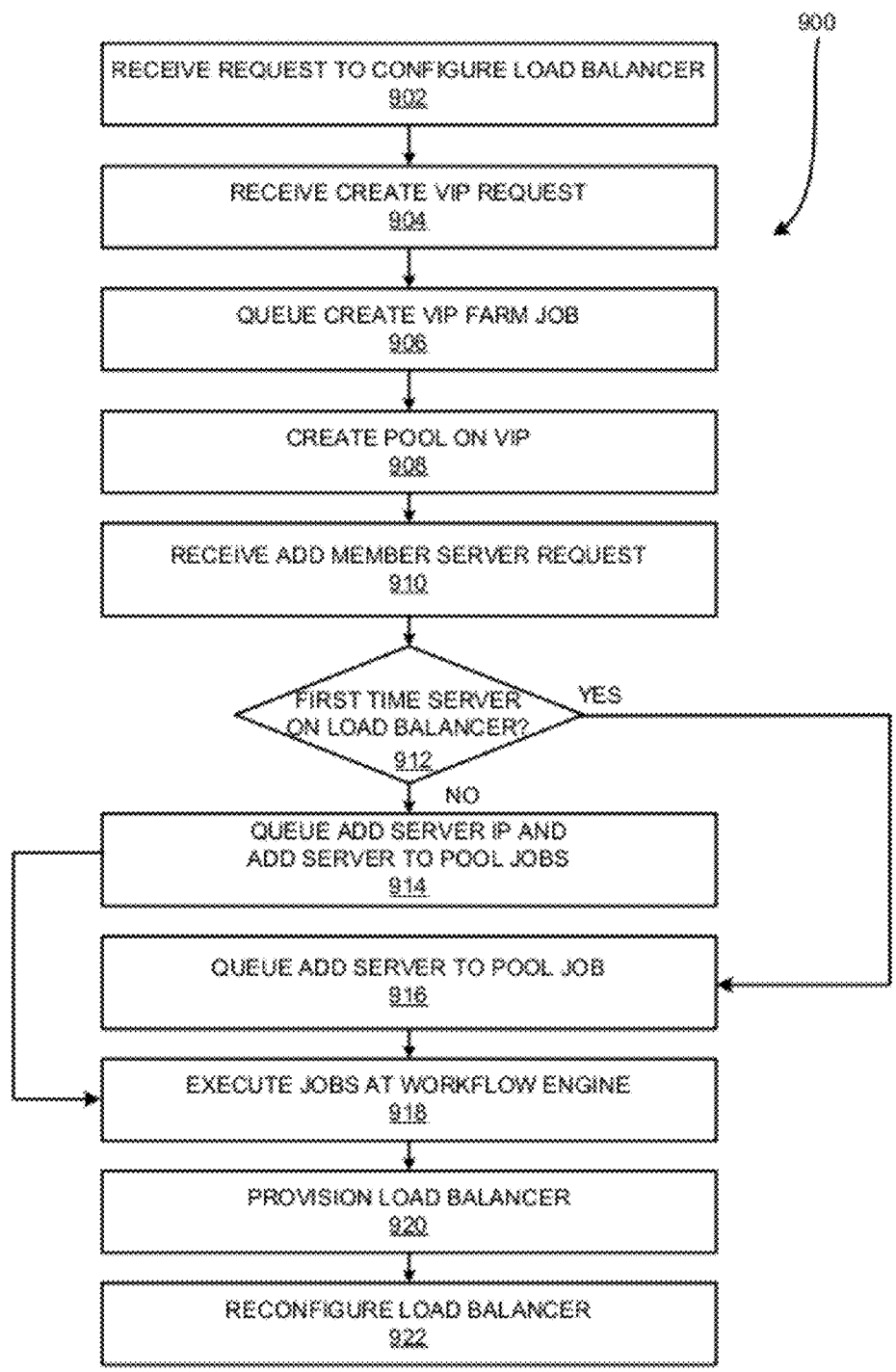
FIG. 9 is a flow diagram of an exemplary process that is associated with establishing and configuring a load balancer.

FIG. 9 is a flow diagram of an exemplary process that is associated with customer or user self-provisioning a load balancer 108-4 in a manner consistent with implementations described herein. Although networks 104-112 may implement other processes for provisioning de-provisioning, monitoring, and/or controlling other resources, they are not illustrated for the sake of simplicity and ease of understanding.

Process 900 may begin upon receipt of a request to configure load balancer 108-4 (block 902). For example, customer web portal device 102-2 may provide user interface view 700 to user device 130 that includes load balancer configuration option 708. Customer web portal device 102-2 may receive a selection of load balancer configuration option 708 and, in response, may provide load balancer configuration interface 712 to user device 130. In some implementations, resource management device 104-3 may retrieve information (e.g., from resource manager database 104-2) for use in presenting current configuration information to the user via user portal device 102-2.

A VIP may be generated (block 904). For example, resource management device 104-3 may receive a request (e.g., via user portal device 102-2) to create a VIP associated with a user account. The VIP may designate a public IP address, a port, a protocol, and a service state. Receipt of this request may cause queuing of create VIP function 505-1 as a job in job database device 104-1 for execution by workflow engine 106-1 (block 906).

A server pool may be added to the VIP via queuing of create pool function 505-3 in job database device 104-1 for execution by workflow engine 106-1 (block 908). In some implementations, an initial server pool may be automatically created upon creation of the VIP. For subsequent server pools, resource management device 104-3 may receive a user request to add a pool to the VIP.

A member server may be added to the pool (block 910). For example, resource management device 104-3 may receive a request (e.g., via user portal device 102-2) to add a server IP to a particular server pool. The request may indicate an IP address and port associated with the member server and a service state that the server should be placed in (e.g., in service or out of service). In some implementations, the IP address allocated to the member may be retrieved from available server resources associated with the user account. This information may be extracted from resource manager database 104-2 (or, for example, IP address management device 110-1) upon receipt of the request.

It may be determined whether the server to be added has been previously added to load balancer 108-4 (block 912). If so (block 912—NO), receipt of the member server add request may cause queuing of add server IP function 505-7, and add server to pool function 505-9 in job database device 104-1 for execution by workflow engine 106-1 (block 914).

If the added server has been previously added to load balancer 108-4 (block 910—YES), receipt of the member server add request may cause queuing of the add server pool function 505-9 in job database device 104-1 for execution by workflow engine 106-1 (block 916). In some implementations, a particular VIP design (e.g., added servers, configured server pools, etc.) may be stored in resource management device 104-3 for later submission. In this case, queuing of functions 505-3, 505-7, and 505-9 may be performed upon submission of the saved design.

Workflow engine device 106-1, which polls/checks job database device 104-1, may detect the job descriptions at job database device 104-1 and perform jobs that are associated with the job descriptions (block 918). Load balancer 108-4 may then be provisioned (block 920). In performing the provisioning, workflow engine device 106-1 may request network management device 106-3 to provision load balancer 108-4.

Load balancer 108-4 may be reconfigured (block 922). For example, customer web portal device 102-2 may receive a selection of an edit VIP or edit member server option indicating one or more changes to be made to an established load balancer configuration. In response, functions corresponding to the changes may be added to job database device 104-1 for execution by workflow engine 106-1, which in turn requests network management device 106-3 to reconfigure load balancer 108-4.

Figure 10:
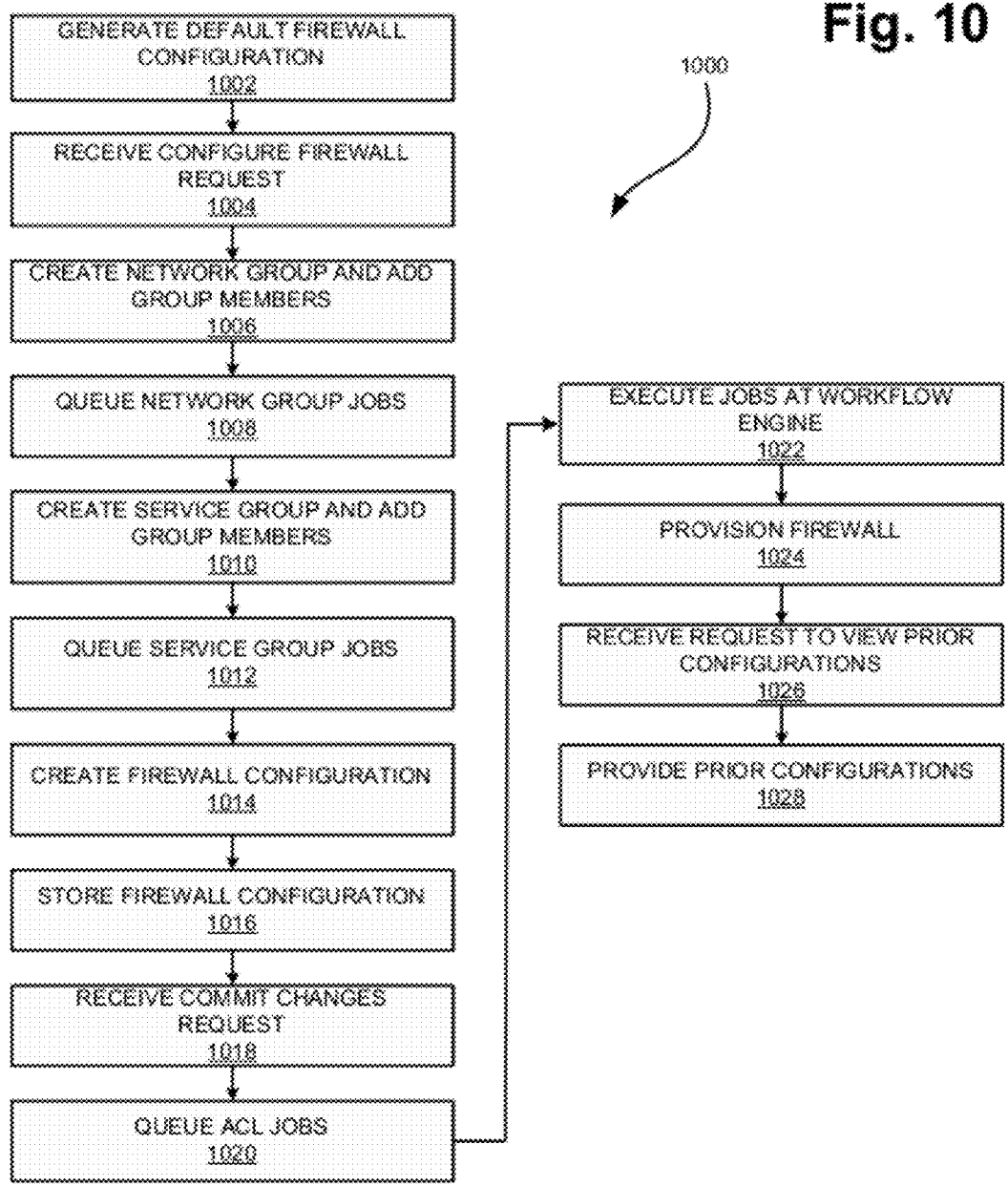
FIG. 10 is a flow diagram of an exemplary process that is associated with configuring a firewall.

FIG. 10 is a flow diagram of an exemplary process that is associated with customer or user self-provisioning a firewall 108-6 in a manner consistent with implementations described herein. Although networks 104-112 may implement other processes for provisioning de-provisioning, monitoring, and/or controlling other resources, they are not illustrated for the sake of simplicity and ease of understanding.

Process 1000 may begin upon application of a default firewall configuration (block 1002). As described above, firewall 108-6 may be configured for each VIP configured in network 100. Accordingly, upon VIP generation (e.g., block 904), default firewall configuration function 510-1 may be queued in job database device 104-1 for execution by workflow engine 106-1. Default firewall configuration function 510-1 may establish a default ACL for the generated VIP.

A user request to configure firewall 108-6 may be received (block 1004). For example, user web portal device 102-2 may relay user interface view 700 to user device 130 that includes firewall configuration option 710. Customer web portal device 102-2 may receive a selection of firewall configuration option 710 and, in response, may relay firewall configuration interface 800 to user device 130. In some implementations, resource management device 104-3 may retrieve information (e.g., from resource manager database 104-2) for use in presenting current configuration information to the user.

A network group may be created and members may be added to the network group (block 1006). For example, resource management device 104-3 may receive a request (e.g., via user portal device 102-2) to create a network group and to add networks or hosts to the network group. As described above, network groups and their members may reference the sources and destinations identified in ACL entries for providing firewall functionality. Receipt of one of these requests may cause queuing of add network group function 510-6, edit network group function 510-7, add network group member function 510-9, and/or edit network group member function 510-10 as a job in job database device 104-1 for execution by workflow engine 106-1 (block 1008).

A service group may be created and members may be added to the service group (block 1010). For example, resource management device 104-3 may receive a request (e.g., via user portal device 102-2) to create a service group and to add ports/protocols to the service group. As described above, service groups and their members may reference the ports and/or protocols identified in ACL entries for providing firewall functionality. Receipt of one of these requests may cause queuing of add service group function 510-12, edit service group function 510-13, add service group member function 510-15, and/or edit service group member function 510-16 as a job in job database device 104-1 for execution by workflow engine 106-1 (block 1012).

A firewall configuration (e.g., ACL entry) may be created or edited (block 1014). For example, resource management device 104-3 may receive a request (e.g., via user portal device 102-2) to create, edit, or delete one or more entries in an ACL associated with firewall 108-6. As described above, creating or editing of an ACL entry may include selection of a source network group, a destination network group, port/protocol information, action information, and state information (e.g., active or inactive).

Resource management device 104-3 may store the firewall configuration (block 1016). For example, as described above, resource management device 104-3 may store revised ACL entries in a manner that enables subsequent review of the changes prior to commitment to jobs database device 104-1. In one implementation, the stored firewall configuration information may be presented to user device 130 via user portal device 102-2.

Resource management device 104-3 may receive request to commit the firewall configuration changes (block 1018). For example, resource management device 104-3 may receive a request to commit all changes to the stored firewall configuration (e.g., ACL entries). Receipt of this request may cause queuing of add create ACL entry function 510-3, edit ACL entry function 510-4, and/or delete ACL entry function 510-5 as a job in job database device 104-1 for execution by workflow engine 106-1 (block 1020).

Workflow engine device 106-1, which polls/checks job database device 104-1, may detect the job descriptions at job database device 104-1 and perform jobs that are associated with the job descriptions (block 1022). Firewall 108-6 may then be provisioned based on the executed jobs (block 1024). In performing the provisioning, workflow engine device 106-1 may request network management device 106-3 to provision firewall 108-6.

Resource management device 104-3 may receive a request to review prior firewall configuration versions (block 1026). For example, resource management device 104-3 may receive a user selection of option 810 in firewall configuration interface 800. In response, resource management device 104-3 may provide a listing of prior firewall configurations to the user (block 1028). For example, resource management device 104-3 may retrieve a listing of prior ACL entries from resource manager database 104-2. In some implementations, the prior ACL entries may be stored in resource manager database 104-2 during prior firewall. In other instances, the prior ACL entries may be retrieved or copied from firewall device 108-6. Regardless, resource management device 104-3 may provide the listing of prior ACL entries to user device 130 via user portal device 102-2.

The above specification describes how a system may provision both virtual resources and physical load balancing and firewall related resources. When a user wishes to obtain or configure such resources (e.g., a establish a VIP, configure a firewall, etc.), the user may connect to an integrated provisioning system via a web portal. Once connected via a web interface, the user may input parameters that describe the desired resources. Based on the parameters, the integrated resource provisioning system may provision and allocate virtual and/or physical resources without manual intervention from a system administrator or an operator.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 9 and 10, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method comprising:
 receiving, by a resource management device, a request, from a user, to configure, based on configuration information, a load balancer for distributing server load across one or more server resources;

receiving, by the resource management device, a request, from the user, to create a load balancing resource pool on the load balancer;

storing the configuration information and the received requests;

receiving, by the resource management device, a request, from the user, to commit the configuration information and the requests;

creating, by the resource management device, one or more jobs based on the committed configuration information and the requests;

queuing the one or more jobs in a jobs database relating to creating the load balancing resource pool;

dequeuing and executing the one or more jobs by a workflow engine to create the load balancing resource pool on the load balancer, wherein the workflow engine calls one or more flows that correspond to the one or more jobs that cause information to be transmitted to the load balancer.

2. The method of claim 1, further comprising:
providing a graphical user interface to a user via a web portal; and
receiving the request to configure the load balancer based on the configuration information and the request to commit the configuration information from the user via the graphical user interface.

3. The method of claim 1, wherein the request to create a load balancing resource pool includes an Internet protocol (IP) address, a port number, a protocol, and a state.

4. The method of claim 1, wherein receiving the request to configure the load balancer, further comprises:
receiving, by the resource management device, a request, from a user, to create one or more member servers on the load balancing resource pool,
wherein the request to create one or more member servers comprises information relating to the one or more member servers; and
storing, by the resource management device, the information relating to the one or more member servers as a server design.

5. The method of claim 4, further comprising:
receiving, by the resource management device, a request, from the user, to queue the server design;
queuing, by the resource management device, one or more jobs in the jobs database relating to creating the one or more member servers based on the request to queue the server design; and
dequeuing and executing, by the workflow engine, the one or more jobs in the jobs database relating to creating the one or more member servers to create the load balancing resource pool on the load balancer.

6. The method of claim 1, further comprising receiving, by the resource management device, a request, from the user, to configure, based on the configuration information, a firewall for protecting network resources from undesired network traffic;
queuing, by the resource management device, one or more jobs in the jobs database relating to applying a default firewall configuration; and
dequeuing and executing, by the workflow engine, the one or more jobs in the jobs database relating to applying a default firewall configuration to establish a firewall configuration.

7. The method of claim 6, wherein when the request is the request to configure the firewall, the method further comprises:

receiving, by the resource management device, a request to edit a firewall configuration,
wherein the request to edit the firewall configuration includes firewall configuration information that includes one or more of a destination group, a source group, a port, a protocol, an action, or a state; and
storing, by the resource management device, the firewall configuration information.

8. The method of claim 7, further comprising:
receiving, by the resource management device, a request, from the user, to commit the firewall configuration information;
queuing, by the resource management device, one or more jobs in the jobs database based on the request to commit the firewall configuration information;
dequeuing and executing, by the workflow engine, the one or more jobs to configure the firewall.

9. The method of claim 8, further comprising:
storing, by the resource management device, versions of the firewall configuration information in a database;
receiving, by the resource management device, a request, from the user, for a selected prior version of the firewall configuration information;
retrieving, by the resource management device, the selected prior version of the firewall configuration information from the database; and
providing, by the resource management device, the selected prior version of the firewall configuration information to the user.

10. Non-transitory computer-readable storage media comprising computer executable instructions for causing one or more processors to:
receive, by the resource management device, a request, from a user, to configure, based on configuration information, a load balancer for distributing server load across one or more server resources;
receive, by the resource management device, a request, from the user, to create a load balancing resource pool on the load balancer;
store the configuration information and the received requests relating to creating the load balancing resource pool;
receive, by the resource management device, a request, from the user, to commit the configuration information and the requests;
queue the one or more jobs in a jobs database relating to creating the load balancing resource pool;
dequeue and execute the one or more jobs by a workflow engine to create the load balancing resource pool on the load balancer,
wherein the workflow engine calls one or more flows that correspond to the one or more jobs that cause information to be transmitted to the load balancer.

11. The non-transitory computer-readable storage media of claim 10, where the instructions cause the one or more processors to:
provide a graphical user interface to a user via a web portal; and
receive the request to configure the load balancer or the firewall and the request to commit the configuration information from the user via the graphical user interface.

12. The non-transitory computer-readable storage media of claim 10, wherein the computer executable instructions for causing one or more processors to receive the request to configure the load balancing resource pool, further cause the one or more processors to:

receive, by the resource management device, a request, from the user, to create one or more member servers on the load balancing resource pool, wherein the request to create one or more member servers comprises information relating to the one or more member servers; and store, by the resource management device, the information relating to the one or more member servers as a server design.

13. The non-transitory computer-readable storage media of claim 10, further comprising computer executable instructions for causing one or more processors to:

receive, by the resource management device, a request, from the user, to configure, based on the configuration information, a firewall for protecting network resources from undesired network traffic;

receive, by the resource management device, a request, from the user, to edit a firewall configuration, wherein the request to edit a firewall configuration includes firewall configuration information that includes one or more of a destination group, a source group, a port, a protocol, an action, or a state; and store, by the resource management device, the firewall configuration information.

14. The non-transitory computer-readable storage media of claim 13, wherein the computer executable instructions for causing one or more processors to receive the request to configure the firewall, further cause the one or more processors to:

store, by the resource management device, versions of the firewall configuration information in a database;

receive, by the resource management device, a request, from the user, for a selected prior version of the firewall configuration information;

retrieve, by the resource management device, the selected prior version of the firewall configuration information from the database; and provide, by the resource management device, the selected prior version of the firewall configuration information to the user.

* * * * *